Nov. 2, 1943.   L. E. TERRY   2,333,599
TIRE BUFFING APPARATUS
Filed Aug. 4, 1941   3 Sheets-Sheet 1

L. E. Terry
INVENTOR
BY Victor J. Evans & Co.
ATTORNEYS

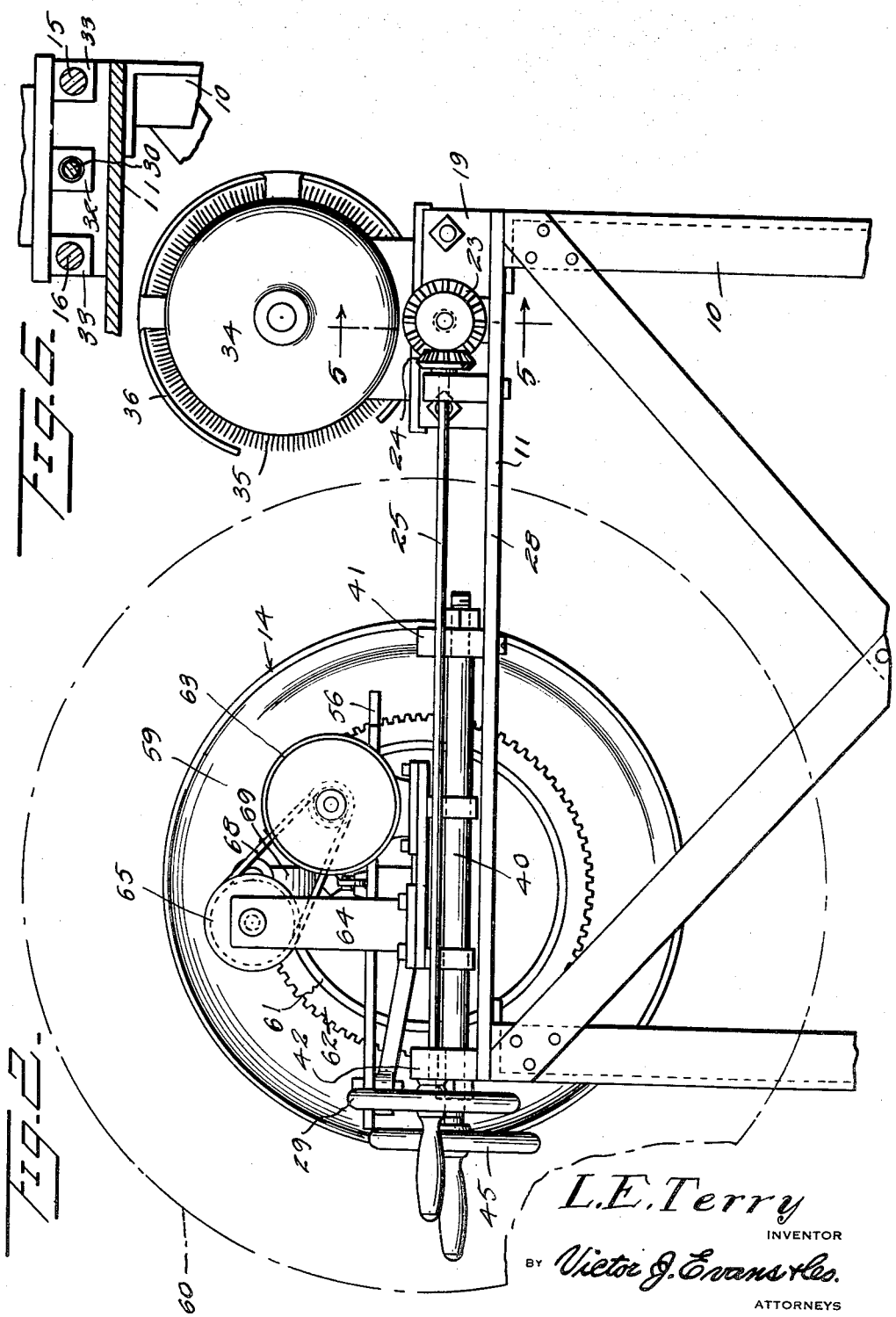

Nov. 2, 1943.  L. E. TERRY  2,333,599
TIRE BUFFING APPARATUS
Filed Aug. 4, 1941  3 Sheets-Sheet 3
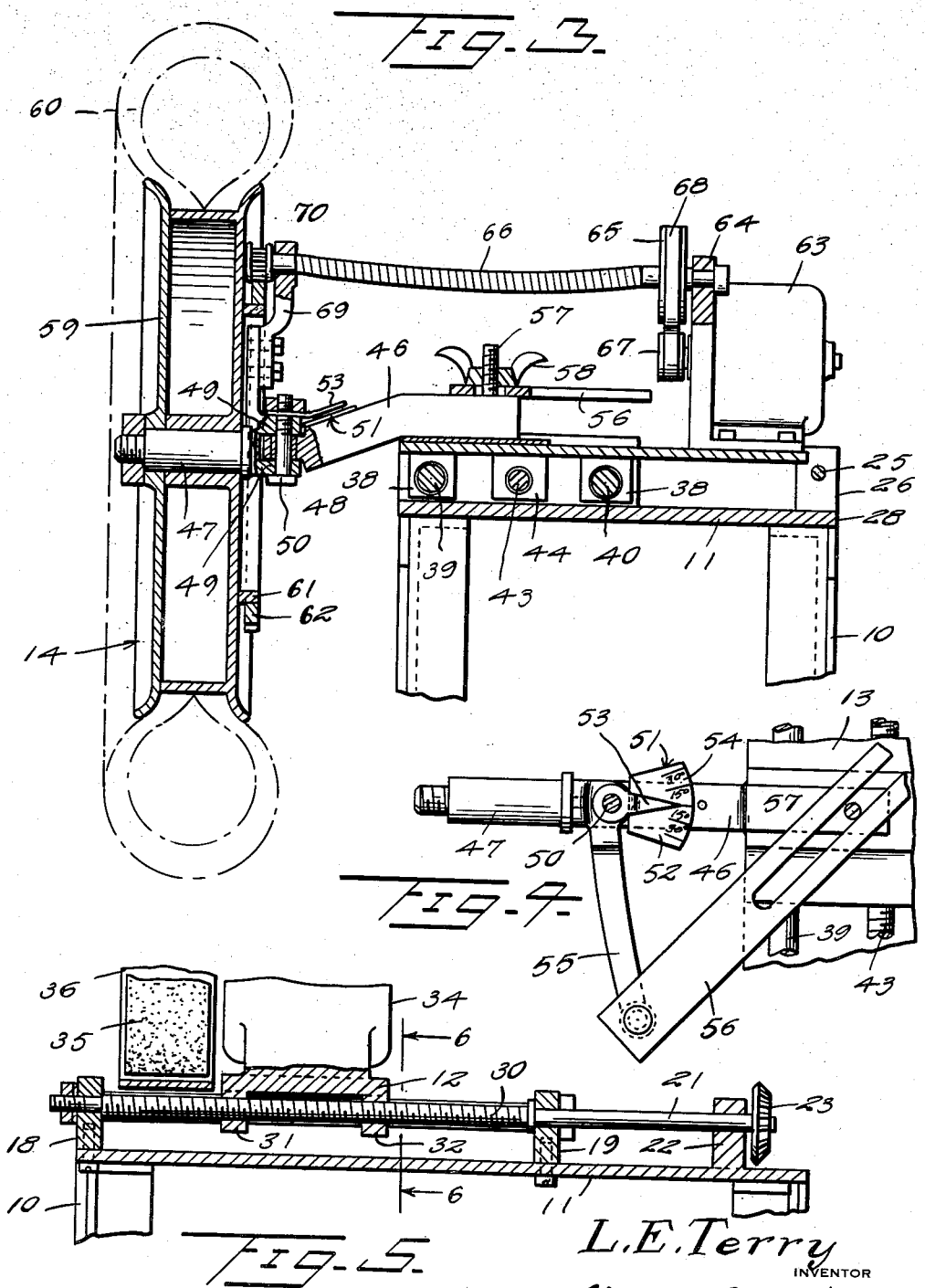
L. E. Terry
INVENTOR
BY Victor J. Evans & Co.
ATTORNEYS Patented Nov. 2, 1943

2,333,599

UNITED STATES PATENT OFFICE 2,333,599

TIRE BUFFING APPARATUS

Luther E. Terry, Williamson, W. Va.

Application August 4, 1941, Serial No. 405,403

6 Claims. (Cl. 29—76)

My invention relates to new and useful improvements in apparatus for removing the worn treads from tires.

An important object of my invention is the provision of a suitable stand for holding a tire supporting means adjustably associated with a buffing tool, the tool being adjustably mounted to properly accommodate the tire in various adjusted positions.

Another object of my invention is the provision of an apparatus of the above-mentioned character wherein separate means are provided for actuating the tire and buffing tool, the arrangement being such that the tire will be rotated at a constant rate of speed in a direction opposed to the direction of rotation of the buffing tool to expedite the buffing operation and to assure uniform treatment of the surface of the tire.

Still another object of my invention is the provision of an apparatus of the above-mentioned character wherein the tire supporting means is angularly adjustable so that various portions of the surface of the tire may be presented to the buffing tool, the arrangement being unique to permit the opposite sides of the tire to be uniformly treated whereby to assure a properly balanced tire after the buffing operation has been completed.

Other objects and advantages of my invention will be apparent during the course of the following description.

In the drawings, forming a part of this specification, and wherein like numerals are employed to designate like parts throughout the same, Figure 1 is a top plan view of a device embodying my invention.

Figure 2 is a rear elevation of the same.

Figure 3 is a fragmentary sectional view taken on the line 3—3 of Figure 1.

Figure 4 is a fragmentary top plan view of a tire supporting saddle comprising a part of the invention.

Figure 5 is a fragmentary vertical sectional view taken on the line 5—5 of Figure 2, and Figure 6 is a fragmentary vertical sectional view taken on the line 6—6 of Figure 5.

Figure 1:
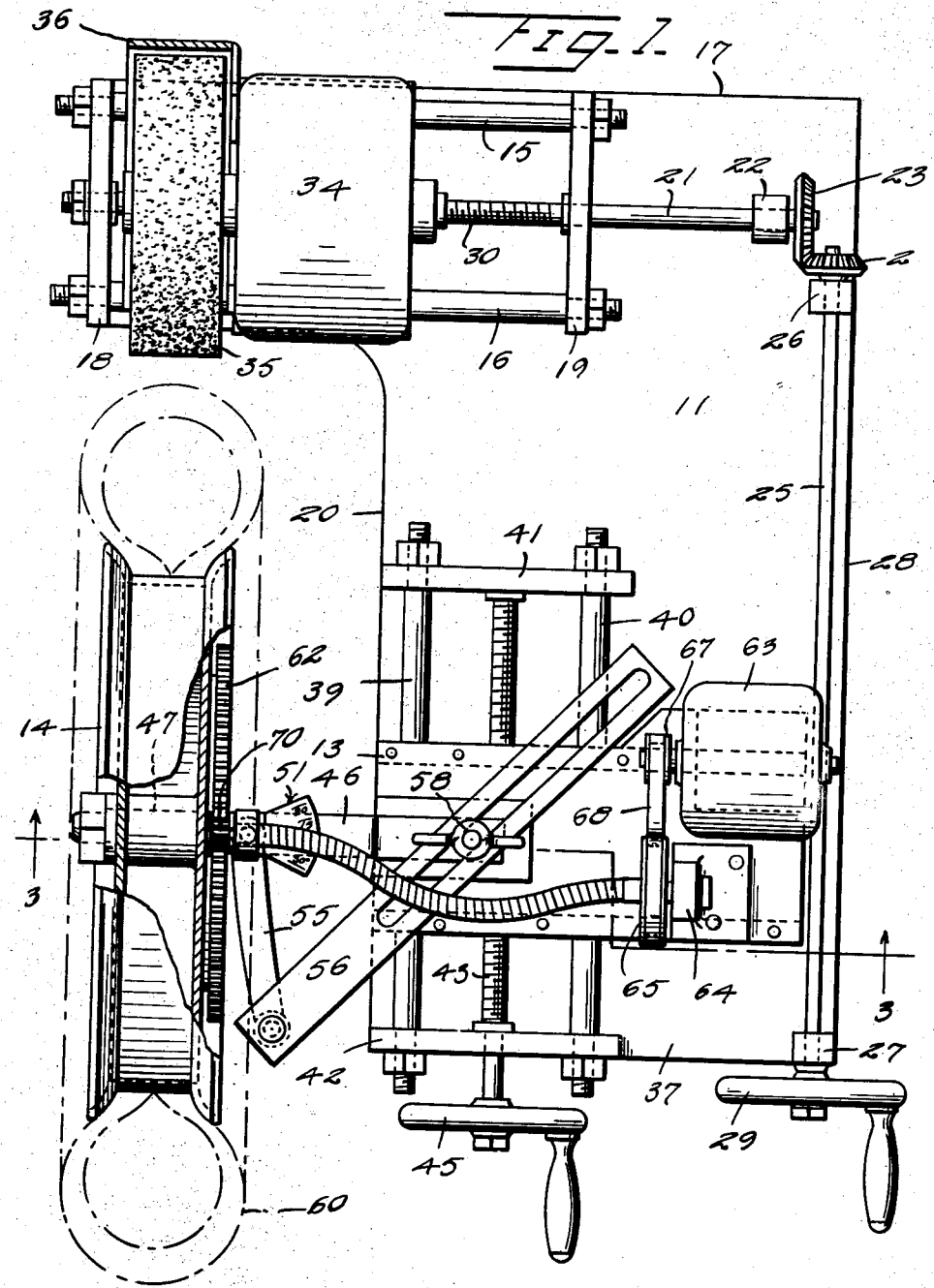

In the accompanying drawings, wherein for the purpose of illustration, is shown a preferred embodiment of my invention, the numeral 10 designates a supporting stand having a flat elongated top 11. The stand may be constructed in any suitable manner and of any suitable material, it being solely provided to support a carriage 12 upon which a suitable buffing tool is mounted and a saddle 13 having tire supporting parts 14 pivotally and rotatably associated therewith, the saddle being slidably mounted on the stand for movement relative to the buffing wheel. I have here illustrated the stand as being formed with a flat sheet metal top portion which rests upon an angleiron framework of sufficient height to position the parts above-mentioned in proper relation to the operator.

The carriage for the buffing tool comprises a pair of guide rods 15 and 16 mounted in spaced parallel relation with each other and with the edge 17 of the top, the opposite ends thereof being fixedly secured to the flanges 18 and 19 upstanding from the said top. The guide rods are located at the extreme end of the stand and the top 11 at this end of the stand is formed with a laterally extending portion which supports the guide rods whereby to position the same essentially laterally of the edge 20 of the top. Mounted intermediate of and in spaced parallel relation with the guide rods 15 and 16 is a shaft 21, which shaft extends substantially beyond the inner flange 19 and is journaled in the standard 22. The portion of the shaft extending beyond the standard is provided with a bevel gear 23 which meshes with the relatively smaller bevel gear 24 mounted on the shaft 25 journaled for rotation in the standards 26 and 27 located in spaced relation along the edge 28 of the top. The end of the shaft 25 remote from the gear 24 carries a hand wheel 29 which is fixedly secured to the shaft so that actuation of the wheel will effect rotation of the shaft 25 and operate through the medium of the gears 23 and 24 to rotate the right-angularly disposed shaft 21. The portion of the shaft 21 extending between the flanges 18 and 19 is screw-threaded, as at 30, to receive the depending tabs 31 and 32 of the carriage 12. The openings in the tabs receiving the threaded portion of the shaft are screw-threaded so that rotation of the shaft will effect movement of the carriage therealong. The carriage is also formed with depending tabs 33 at each of its four corners, which last-mentioned tabs slidably receive the guide rods 15 and 16 for holding the carriage in an essentially horizontal position at all times during its travel.

The motor 34 is supported by the carriage and a buffing wheel 35 is fixedly mounted on the drive shaft thereof. The wheel is of essentially greater diameter than the motor housing whereby to project substantially beyond the housing and beyond the adjacent edges of the laterally offset portion of the top 11. A suitable guard or shield 36 is mounted on the motor housing to cover the major portion of the buffing wheel, the said shield leaving only the portion of the wheel projecting beyond the inner edge of the offset portion of the top exposed. The shield 36 prevents the operator from inadvertently contacting the rapidly rotating buffing wheel and also carries the dust to a position where it may be easily disposed of.

As clearly shown in the drawings, the tire supporting saddle 13 is mounted adjacent the edge 37 of the top 11 and remote from the edge 17 thereof. The saddle is provided with rectangularly arranged depending tabs which slidably receive the spaced parallel guide rods 39 and 40, the opposite ends of which guide rods are supported by the upstanding flanges 41 and 42 carried by the top. The guide rods extend in a direction at right angles to the guide rods 15 and 16 so that shifting of the saddle therealong will move the saddle toward and away from the buffing tool. A screw-threaded shaft 43 is supported for rotation by the flanges 41 and 42 intermediate of and in spaced parallel relation with the guide rods 39 and 40. The portion of the shaft 43 extending between the flanges is screw-threaded for its entire length and is screw-threadedly received within internally screw-threaded openings in the depending tabs 44 formed on the saddle. A hand wheel 45 is fixedly attached to the end of the shaft 43 projecting beyond the flange 42 whereby to permit the shaft to be manually rotated to effect shifting of the saddle along the guide rods within limits defined by the supporting flanges.

The saddle has tire supporting parts mounted thereon which includes an arm 46, one end of which is welded or otherwise fixedly secured thereto. The other end of the arm projects substantially beyond the edge 20 of the top 11 and is pivotally connected to the axle 47. As best illustrated in Figure 3, the extending end of the arm is former with a reduced portion 48 which is received between the bifurcations 49 formed at one end of the axle and these interconnecting parts are provided with registering openings which receive the pivot pin 50.

The above arrangement permits the axle to rock about a vertical axis and the degree of movement of the axle from a central neutral position is determined by an indicator means 51. The indicator is here illustrated as comprising a plate 52 fixedly mounted on the arm 46 adjacent the connecting end of the axle and a pointer 53 fixedly mounted on the connecting end of the axle. The pointer extends in spaced relation above the plate and registers with the arcuately arranged equi-spaced degree markings 54 inscribed on the upper surface of the plate. When the axle is axially aligned with the arm, the pointer registers with the 0° marking and when the axle is moved angularly in either direction from the 0° marking, the amount of the turning movement will be registered by the markings at either side of the 0° mark.

I have provided means for holding the axle in a selected angular position relative to the supporting arm, which means includes a pivot arm 55 attached to and extending laterally from the axle. A slotted link arm 56 has one end pivotally connected to the distal end of the arm 55 and a screw-threaded stud bolt 57 upstanding from the attached end of the arm 46 extends through the slot in the link whereby to restrict movement of the link to within limits defined by the length of the slot. A manually operable nut 58 is carried by the portion of the stud bolt projecting above the link arm, which nut may be moved into pressed engagement with the arm to hold the same immovably positioned or it may be easily manually retracted to permit the link arm to be easily moved in either direction. Obviously movement of the link arm will effect angular movement of the pivot arm 55 whereby to angularly rock the axle 47 about its vertical axis.

A tire supporting rim 59 is mounted for rotation on the axle 47 and the peripheral face of the flange is suitably formed to securely hold a tire 60 associated therewith. The inner surface of the tire supporting flange is provided with an extending annular bead 61 on which a circular gear 62 is fixedly mounted.

In order that the tire may be made to rotate at a uniform rate of speed, I have mounted a motor 63 at the end of the saddle remote from the tire supporting parts. A standard 64 is mounted on the saddle laterally of the motor for supporting the pulley 65 carried by one end of the flexible connection 66. The drive shaft of the motor is provided with a pulley 67 of essentially smaller diameter than the pulley 65 and an endless belt 68 encircles the pulleys 65 and 67 so that energization of the motor will drive the connection 66. The opposite end of the connection is supported by a standard 69 upstanding from the pivoted end of the axle 47 and the portion thereof extending beyond the supporting standard carries a small pinion 70 which meshes with the circular gear 62 carried by the tire supporting flange.

Attention is directed to the fact that both of the hand wheels 29 and 45 extend from one end of the supporting stand. It will also be noted that the tire supporting saddle is mounted at this end of the stand and that the pivot arm 55 comprising an adjunct of the tire supporting parts extends in the direction of the hand wheels. This unique arrangement permits the operator to position himself at the end 37 of the supporting stand and, when thus positioned, all of the controls of the device are readily manually accessible. He may thus easily and expeditiously effect such adjustments as are necessary in operating the device whereby to greatly expedite the entire operation of buffing the tire.

In operation, the tire to be buffed is mounted on the rim 59. A tube of conventional construction is first placed in the tire and, after application of the tire to the rim, air under pressure is admitted into the tube whereby to prevent the tire from buckling when the same is brought into contact with the buffing tool. The conventional procedure in a recapping, semi-capping or retreading operation is to first buff the peripheral surface of the tire and this is accomplished by positioning the tire and buffing tool in alignment, as illustrated in Figure 1, and thereafter advancing the tire into touching relation with the buffing tool. By rotating the hand wheel 29, the buffing tool may be properly aligned with the tire and by rotating the hand wheel 45, the tire may be moved into proper association with the buffing tool. The control switches for the motors 34 and 63 are preferably located in positions readily accessible to the operator and, if desired, these motors may be operated from a master switch. When the motors are energized, the motor 34 will rotate the buffing tool at an essentially high rate of speed and the motor 63 will rotate the tire at a relatively low rate of speed. It should be noted at this point that the tire is made to rotate in a direction opposed to the direction of rotation of the buffing tool whereby to effect a maximum efficiency of operation. By assuring a proper concentric mounting of the tire with respect to the axle, the wheel will properly contact all portions of the tire and will remove any high spots or irregularities in the surface thereof. When the tire is in the above-mentioned position the indicator pointer 53 will be in register with the 0° indicator mark.

The next operation is to buff the shoulders of the tire and this is accomplished by loosening the nut 58 and sliding the link arm 56 along the stud bolt 57 until the pointer 53 indicates that the proper angular movement has been made. Obviously this operation will move the portion of the tire adjacent to the buffing wheel substantially to one side of the neutral position. It will then be necessary to operate the hand wheel 29 to again effect registration of the tool with the tire. By reason of the fact that the tire is made to pivot about a central point, the periphery thereof will be made to swing in an arc and angularly positioning of the tire will therefore move the periphery of the tire away from the buffing tool. This movement is compensated for by actuation of the hand wheel 45 to shift the saddle in the direction of the buffing tool. After one shoulder of the tire has been buffed, the tire may be pivoted an equal number of degrees in the opposite direction to move the other shoulder of the tire into register with the buffing tool. By tilting the tire an equal number of degrees at each side of the neutral position during buffing of the shoulders, a perfectly balanced and uniform buffing of the tire is assured whereby to permit proper application of the new tread. It will be readily apparent that, by mounting the standard 69 on the axle, the pinion 70 will move angularly with the tire rim and that this angular adjustment of the pinion will be permitted by the flexible connection 66.

I prefer that the buffing wheel 35 be removably associated with the drive shaft of the motor 34 so that various types of buffing devices may be applied thereto to perform such separate operations on the tire as may be necessary to complete the buffing operation.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In a tire buffing apparatus, the combination of a support having a buffing means, an axle adjustably mounted on said support for movement toward and away from said buffing means, a tire support rotatably mounted on said axle and comprising first and second plates, said first plate having a hub rotatably mounted on the axle and abutting the second plate to space the two plates, a peripheral flange on said first plate engaging said second plate and so arranged as to provide a trough for supporting the tire, means coacting with said axle to hold the first and second plates in connected relationship, a drive means, a gear fixed to said first plate, and a gear means meshing with said first mentioned gear and operatively connected with said drive means to impart rotation to the tire support.

2. The invention described in claim 1 wherein said drive means includes a flexible shaft, and means pivotally connecting said axle with the support.

3. The invention described in claim 1 wherein said axle is provided with a radial arm for supporting said drive means and said gear means.

4. The invention described in claim 1 wherein said axle is pivotally connected with said support, an arm fixed to said axle, and a slotted bar means pivotally connected with said arm and adjustably connected with said support to shift the angular position of said tire support with respect to said buffing means.

5. The invention described in claim 1 wherein an arm is fixed to and projects laterally from said axle, a relatively fixed scale, a pointer fixed to said axle and coacting with said scale, said axle being pivotally connected with said support, and means acting on said arm for imparting pivotal movement to the axle, with said pointer indicating angular axle adjustment on said scale.

6. In a tire buffing apparatus, the combination of a support having a buffing means, an axle adjustably mounted on said support for movement toward and away from said buffing means, a tire support rotatably mounted on said axle and comprising first and second plates, said first plate having a hub rotatably mounted on the axle and abutting said second plate to space the first and second plates, a peripheral flange on one of said plates engaging the other of said plates and so arranged as to provide a trough for supporting the tire, means coacting with said axle to hold the first and second plates in connected relationship, a drive means, a gear fixed to one of said plates, and a second gear meshing with said first mentioned gear and operatively connected with said drive means to impart rotation to said tire support.

LUTHER E. TERRY.